Patented Aug. 27, 1929.

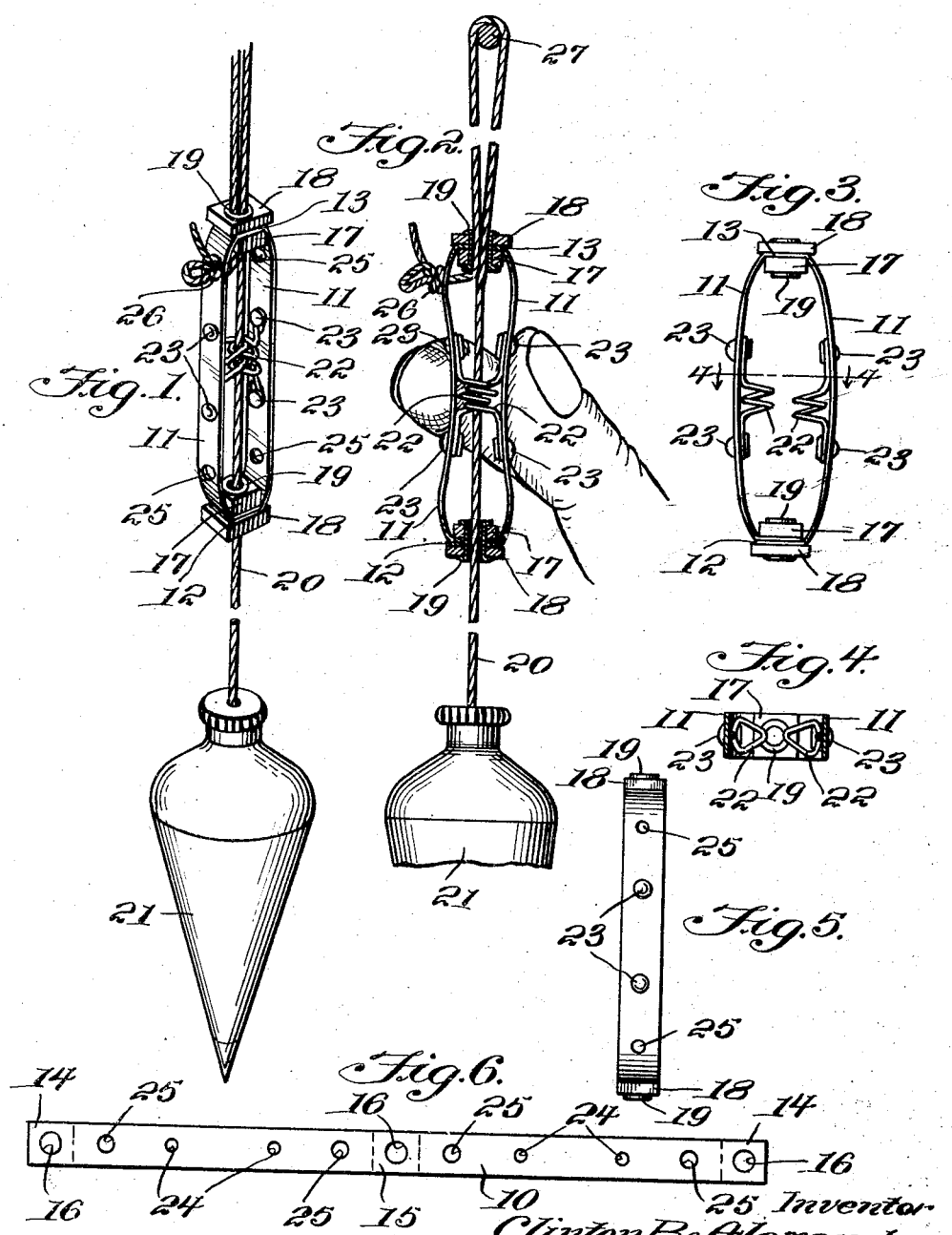

1,725,748

UNITED STATES PATENT OFFICE.

CLINTON B. ALEXANDER, OF WASHINGTON, DISTRICT OF COLUMBIA.

SLACK ADJUSTER.

Application filed October 5, 1928. Serial No. 310,634.

This invention relates to slack adjusters and is an improvement upon the adjuster disclosed in Patent #1,229,855, granted to me June 12, 1917.

Like the patent above mentioned, an object of the invention is to provide means for adjusting lines of various characters, such as the lines of plumb bobs and the like, although the invention may be made of a proper size for use with guy ropes, ropes of sailing vessels, or in any connection where quick adjustment and positive grip are important factors.

The primary object of the present invention is to improve and simplify the construction disclosed in the patent referred to, so that the device may be cheaply sold, the construction materially reducing the cost of manufacture without sacrificing any of its advantageous features.

With the above and other objects in view, the invention further includes the following novel features and details of construction, to be hereinafter more fully described, illustrated in the accompanying drawings and pointed out in the appended claims.

In the drawings:—

Figure 1 is a perspective view of the invention shown in connection with a plumb bob, the adjuster being in gripping position.

Figure 2 is a sectional view showing the line released.

Figure 3 is an elevation of the invention per se.

Figure 4 is a section on the line 4—4 of Figure 3.

Figure 5 is a side view of the adjuster.

Figure 6 is a view of the blank from which the frame is made.

Referring to the drawings in detail wherein like characters of reference denote corresponding parts, the invention as shown comprises a frame which is formed from a single length of resilient material as shown at 10 in Figure 6 of the drawings. This material is shaped to provide spaced resilient side members 11 which are connected by end members 12 and 13, the end member 12 being formed of the overlapped ends 14 of the blank shown in Figure 6, while the end member 13 is formed by the intermediate portion 15.

The end members 12 and 13 are provided with openings 16, the openings 16 in the end member 12 registering when the ends 14 are overlapped.

Secured upon opposite sides of the end members 12 and 13 are inner and outer blocks 17 and 18 respectively. These blocks are also provided with openings which register with the openings 16 and receive hollow rivets 19. These rivets as shown in Figure 2 of the drawings act to hold the frame assembled and also provide relatively long guides for the line 20 of the plumb bob 21.

Secured to the opposed face of the side members 11 are gripping members 22. These members are composed of wire formed into a plurality of substantially triangular-shaped convolutions with their ends riveted or otherwise secured to the side members 11 as shown at 23.

By reference to Figure 6 of the drawings it will be seen that the strip 10 is provided with openings 24 for the rivets 23 and with openings 25. These last mentioned openings are located adjacent opposite ends of the frame for the passage of the line 20 which may be knotted as indicated at 26 to hold the line in place. The line passes upward around a suitable support indicated at 27 and downward through the adjuster and is gripped between the convolutions of the gripping members 22.

As in the form of the invention disclosed in my patent referred to, an inward pressure upon the side members 11 of the frame as shown in Figure 2 of the drawings will release the line so that a quick adjustment may be made, while release of pressure upon the side members will cause the gripping members 22 to engage the line, so that the latter will be distorted out of a direct line by the several intersections of the gripping members and a positive grip obtained.

The invention is susceptible of various changes in its form, proportions and minor details of construction and the right is herein reserved to make such changes as properly fall within the scope of the appended claims.

Having described the invention what is claimed is:

1. In a line adjuster, a frame embodying end members and spaced resilient side members extending from the end members, said end members having openings therethrough, blocks upon opposite sides of each of the end members and also having openings therethrough, hollow rivets extending through the openings of the blocks and end members to hold the parts assembled and provide line guides, and opposed interlocking gripping members carried by said side members intermediate their ends.

2. In a line adjuster, a frame formed from a single strip of resilient metal shaped to provide side members and end members connecting the side members, said end members having openings therein and said side members having openings adjacent the end members, blocks upon opposite sides of each of the end members and also having openings therethrough, hollow rivets extending through the openings of the blocks and end members to hold the parts assembled and provide guide lines, and opposed interlocking gripping members carried by said side members intermediate their ends.

3. In a line adjuster, a frame formed from a single strip of resilient material having its ends overlapped and shaped to provide side members and end members connecting the side members, said end members having openings therethrough, means to secure the overlapped ends of the strip together, and opposed interlocking gripping members carried by said side members intermediate their ends.

In testimony whereof I affix my signature.

CLINTON B. ALEXANDER.